(12) United States Patent
Rohrbach et al.

(10) Patent No.: US 6,980,790 B1
(45) Date of Patent: Dec. 27, 2005

(54) INTERMITTENT, LOW BANDWIDTH, WIRELESS DATA NETWORK AND METHOD OF OPERATION THEREOF

(75) Inventors: William R. Rohrbach, Towaco, NJ (US); Nitin J. Shah, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 621 days.

(21) Appl. No.: 09/723,265

(22) Filed: Nov. 27, 2000

(51) Int. Cl.[7] .......................................... H04M 11/04
(52) U.S. Cl. .............................. 455/404.1; 340/539.16; 340/539.17
(58) Field of Search ................................ 340/426, 428, 340/430, 539, 540, 539.16, 514, 10.4–10.5, 340/541, 539.1, 539.14, 539.17, 539.22, 340/54; 455/404.1–404.2, 422.1, 456.1

(56) References Cited

U.S. PATENT DOCUMENTS

| | | | |
|---|---|---|---|
| 3,696,368 A * | 10/1972 | Kauffman | 340/553 |
| 4,117,405 A * | 9/1978 | Martinez | 455/502 |
| 4,550,312 A * | 10/1985 | Galloway et al. | 340/539.16 |
| 4,918,425 A | 4/1990 | Greenberg et al. | |
| 5,140,308 A * | 8/1992 | Tanaka | 340/539.17 |
| 5,223,844 A | 6/1993 | Mansell et al. | |
| 5,416,725 A | 5/1995 | Pacheco et al. | |
| 5,422,626 A * | 6/1995 | Fish | 340/539.17 |
| 5,454,024 A * | 9/1995 | Lebowitz | 379/40 |
| 5,465,388 A * | 11/1995 | Zicker | 455/404.1 |
| 5,515,419 A * | 5/1996 | Sheffer | 455/456.6 |
| 5,568,121 A * | 10/1996 | Lamensdorf | 340/539.17 |
| 5,587,701 A * | 12/1996 | Hess | 340/541 |
| 5,596,625 A * | 1/1997 | LeBlanc | 455/404.2 |
| 5,675,371 A * | 10/1997 | Barringer | 725/148 |
| 5,717,378 A * | 2/1998 | Malvaso et al. | 340/506 |
| 5,745,849 A * | 4/1998 | Britton | 455/404.1 |
| 5,764,886 A * | 6/1998 | Danielson et al. | 714/47 |
| 5,937,355 A * | 8/1999 | Joong et al. | 455/466 |
| 6,011,967 A * | 1/2000 | Wieck | 455/404.1 |
| 6,636,732 B1 * | 10/2003 | Boling et al. | 455/404.1 |

FOREIGN PATENT DOCUMENTS

| | | | |
|---|---|---|---|
| EP | 0 417 944 A2 | 3/1991 | |
| JP | S50-059684 | 5/1975 | |
| WO | WO 98/16412 | 4/1998 | |
| WO | WO 99/59523 | 12/1998 | |
| WO | WO 99/35624 | * 7/1999 | G08B 1/08 |

* cited by examiner

*Primary Examiner*—Charles N. Appiah

(57) ABSTRACT

For use in a wireless voice network, an alarm system and method of operation thereof. In one embodiment, the alarm system includes: (1) a local transceiver that, in response to a received stimulus, establishes an out-of-band wireless link of diminished bandwidth to a wireless central monitoring station in the wireless voice network and (2) a local controller, coupled to the transceiver for bidirectional communication therewith, that receives commands from the wireless central monitoring station via the wireless link.

21 Claims, 3 Drawing Sheets

INTERMITTENT, LOW BANDWIDTH, WIRELESS DATA NETWORK AND METHOD OF OPERATION THEREOF

TECHNICAL FIELD OF THE INVENTION

The present invention is directed, in general, to wireless data communications and, more specifically, to a wireless data network that operates intermittently and interstitially and a method of operating the same.

BACKGROUND OF THE INVENTION

Security systems are used widely around the world in both commercial and residential settings. Most systems register alarm signals both locally and at central monitoring stations, commonly located within the same city or region. The central monitoring stations may be either local law enforcement or private services, which usually notify the police force. Commonly, an alarm is triggered and the security system activates a local warning and seizes a conventional telephone line to notify the central monitoring station of the situation.

Many of these security systems employ cellular backups in addition to common ground line communications when alarms are triggered. These backup are attractive, since conventional telephone lines are subject to being severed during unauthorized activity (e.g., burglary). Should no telephone line be available, the system switches to the cellular backup to establish a cellular link with the monitoring station to report the alarm. Alternatively, some systems establish concurrent conventional telephone links and cellular phone links with the central monitoring station. The cellular backups are essentially commercially available cellular telephones that request and receive high quality wireless voice communication channels.

As common as these backups have become, they do possess limitations which restrict their economic viability. One limitation associated with present cellular backup systems is that communications are limited to one-way outgoing messages. Such systems do not posses the ability to contact the backups independently because the backups are not able to receive messages from outside sources. As previously stated, when an event-driven alarm occurs, the system establishes a cellular link with the associated central monitoring station and transmits an alarm signal. If the security system develops a problem that does not trigger an alarm signal (e.g., loss of power, sensor failure or internal circuitry failure), no alarm signal is transmitted and the central monitoring station cannot establish a link to the alarm system to verify system status.

Another limitation commonly encountered when employing present cellular backup systems is the large bandwidth required to transmit a relatively small alarm signal. Conventional cellular backup systems must utilize the same baud rates and bandwidths as commercially available personal cellular communication systems (commonly telephones). Commercial cellular lines are designed for voice and video transmissions (continuous media) and therefore require large bandwidths and baud rates with little or no interruptions to support a desired quality of service. Customers using security systems with cellular backups are required to pay for high quality, continuous media cellular services where systems with smaller bandwidths could suffice.

In an attempt to solve this problem, designers of more recent systems considered using cellular digital packet data (CDPD) technology to overcome the problems with bandwidth usage. CDPD may be broadly described as a new process for cellular use as a means of data transmission. Through CDPD technology, data packets are sent along idle channels of existing cellular voice networks. Further, these packets may be sent at very high speeds during pauses in cellular phone conversations. By adding CDPD to an existing cellular system, cellular operators can transmit data at much high speeds without seeking out separate data transmission lines.

Unfortunately, CDPD has many drawbacks which make it unattractive as a solution to the problems encountered. Although this technology is able to utilize in-band "spaces" in cellular traffic, even during peak usage times, large bandwidth are still required for the transmissions. Further, where in-band traffic "spaces" are not available, CDPD seizes a full cellular channel, thus subjecting the user to the inefficiencies encountered while employing full bandwidth, commercial cellular lines.

Finally, power supplies and battery backups are another concern encountered while employing conventional cellular backups. Using and maintaining cellular backups require expensive power supplies and battery backups which further economically burden the user. Since commercial cellular systems require continuous transmission with little or no interruptions, maintaining system power is important. Since security systems transmit such small amounts of data, using commercial quality cellular lines amount to significant overkill and the associated power systems contribute to cost inefficiencies.

Accordingly, what is needed in the art is an improved alarm system that overcomes the above-described deficiencies of the prior art.

SUMMARY OF THE INVENTION

To address the above-discussed deficiencies of the prior art, the present invention provides, for use in a wireless voice network, an alarm system and method of operation thereof. In one embodiment, the alarm system includes: (1) a local transceiver that, in response to a received stimulus, establishes an out-of-band wireless link of diminished bandwidth to a wireless central monitoring station in the wireless voice network and (2) a local controller, coupled to the transceiver for bidirectional communication therewith, that receives commands from the wireless central monitoring station via the wireless link.

The present invention therefore introduces the broad concept of employing diminished-bandwidth transceivers in a wireless alarm network capable of bidirectional communication. For purposes of the present invention, a "wireless link of diminished bandwidth" is defined as a wireless link having a bandwidth insufficient to provide commercially-acceptable quality of service standards for voice communication that does not interfere with normal voice traffic in a wireless voice network (being, in that sense, "out-of-band"). Conventional cellular telephones are not capable of establishing a wireless link of diminished bandwidth.

In one embodiment of the present invention, the local transceiver and the wireless central monitoring station exchange data in bursts. "Bursts," for purposes of the present invention, are discontinuous portions of an overall transmission. Bursts are not suitable for communicating continuous (streaming) media, such as real-time voice. Of course the local transceiver and the wireless central monitoring station may be capable of engaging in an entire communications session in one burst.

In one embodiment of the present invention, the stimulus is an alarm event communicated from the local controller to the local transceiver. In a more specific embodiment of the present invention, the local event is selected from the group consisting of: (1) a user-triggered alarm event and (2) an intruder-triggered alarm event. Alternatively, the local event may be a given time (of day, perhaps) or may be an informational event not meant to generate an alarm, such as may occur if the (authorized) user opens a door or activates an oven.

In one embodiment of the present invention, the stimulus is a command communicated from the wireless central monitoring station to the local transceiver. In a more specific embodiment of the present invention, the wireless central monitoring station establishes the wireless link exclusively with the local transceiver. In a more specific embodiment of the present invention, the wireless central monitoring station broadcasts the command to a plurality of transceivers including the local transceiver. Broadcasts, such as may be employed to synchronize local alarm system clocks, greatly conserve wireless voice network bandwidth.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
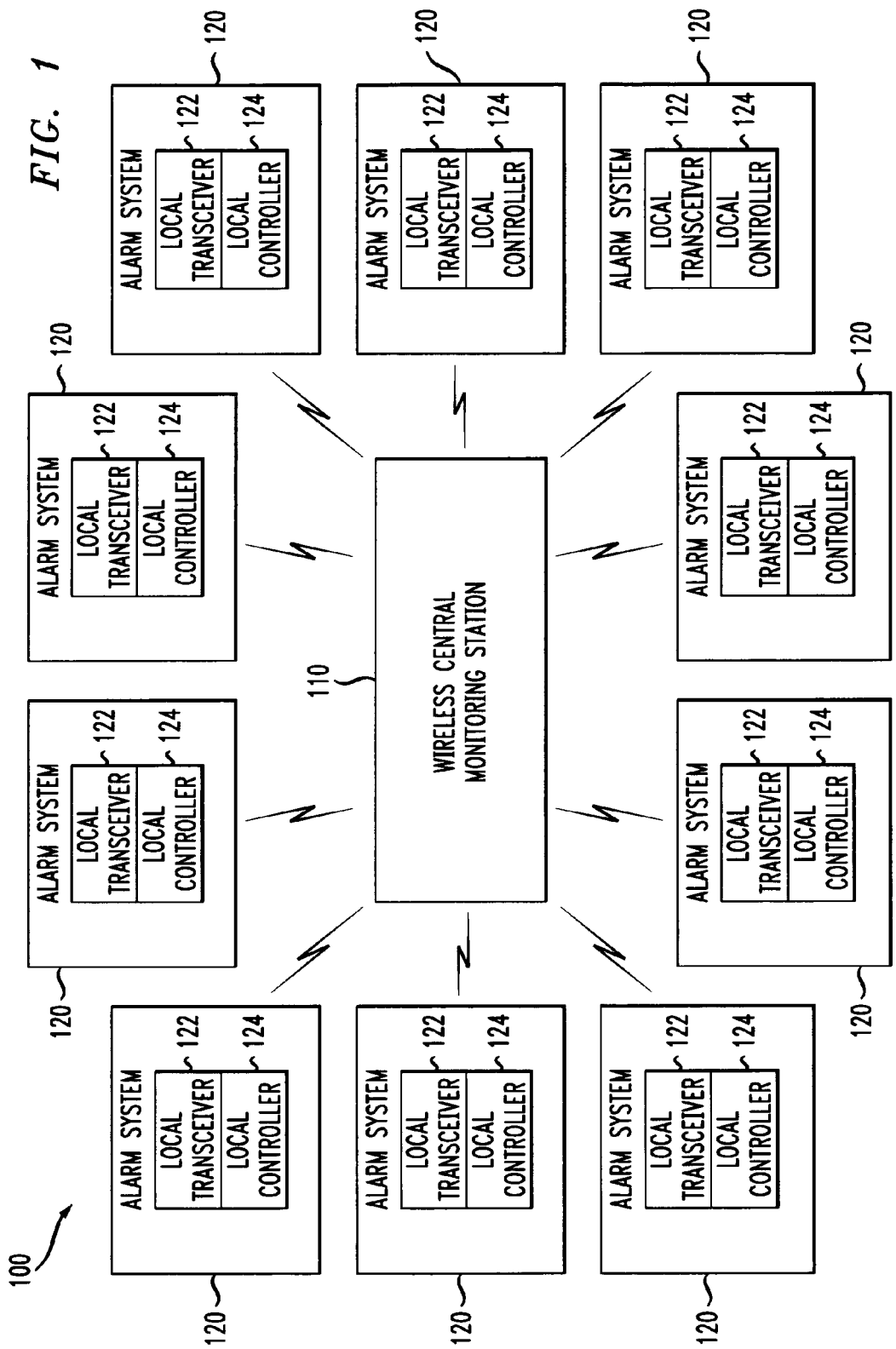
FIG. 1 illustrates a wireless voice network employing embodiments of an alarm system constructed according to the principles of the present invention.

Referring initially to FIG. 1, illustrated is a wireless voice network employing embodiments of an alarm system constructed according to the principles of the present invention. The network 100 consists of a wireless central monitoring station (WCMS) 110 that is wirelessly coupled to a plurality of alarm systems (one of which designated 120) for communication therewith. Each alarm system 120 contains a local transceiver 122 coupled to a local controller 124 for bidirectional communication. The transceiver 122 is capable of establishing an out-of-band wireless link of diminished bandwidth with the WCMS 110 and the controller 124 can send and receive commands and data to and from the WCMS 110 via the established wireless link. The transceiver 122 and the WCMS 110 exchange data in bursts that consist of discontinuous portions of an overall transmission. Within the wireless link, such burst transmissions allow for diminished bandwidth in the wireless link since the bursts do not require real-time voice-quality lines of communication.

The WCMS 110 can contact each individual alarm system 120 to "poll" the individual system 120. During polling, the WCMS 110 establishes a wireless link with the transceiver 122 to relay commands to the controller 124 which may include downloading non-alarm related data (e.g., door openings) to routine maintenance and diagnostics (e.g., setting system clocks). By allowing bidirectional communication with the various alarm systems 120, the WCMS 110 can remotely monitor the operational status of the systems 120. In some cases, where larger bandwidths are necessary, required maintenance and diagnostics would be performed only during non-peak operating hours (e.g., late night/early morning hours).

Additionally, bidirectional communications allow the WCMS 110 to remotely upgrade the system software in the alarm systems 120. In order to distribute the upgrade in the network 100, the WCMS 110 transmits the software either to alarm systems 120 in a small geographic region, to a certain class of customers dispersed throughout a major geographic region who subscribe to extra features/services or to a single user who subscribes to a specific or customized service. Utilizing the wireless link for upgrading the system eliminates the need to dispatch staff for on-site system upgrades and consolidates all software administration, monitoring and security responsibilities into a single central location under the control of the system administrator. Consequently, such a system would have dramatic impact on cost, security and integrity of the wireless voice network 100 and the industry as a whole.

Figure 2:
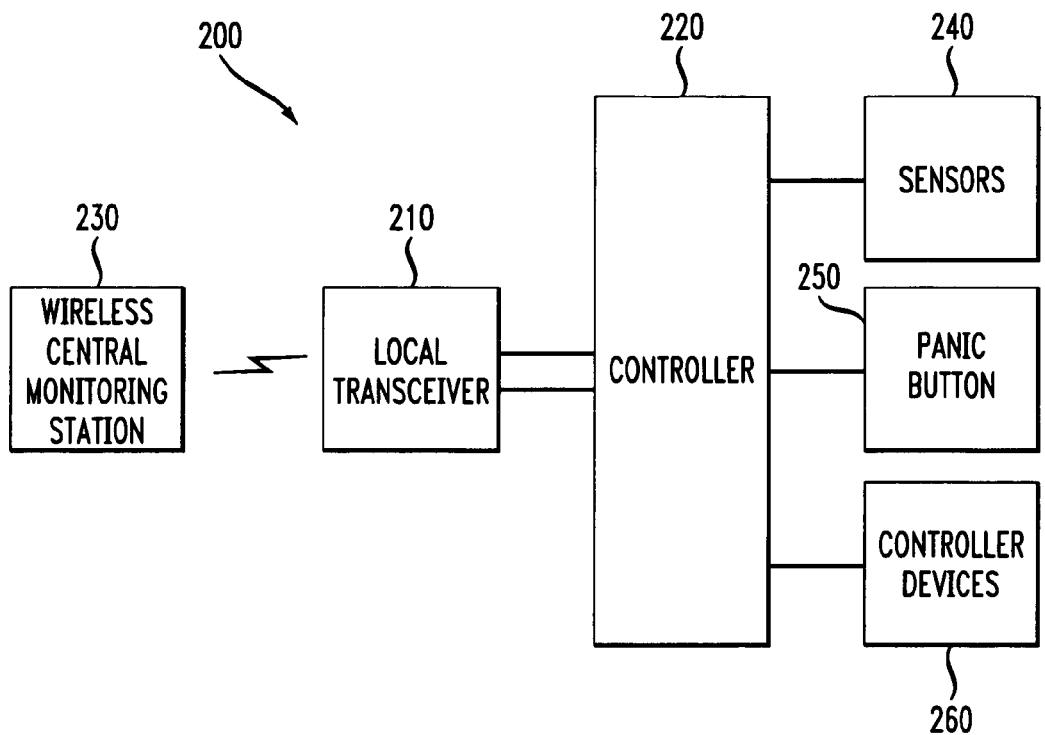
FIG. 2 illustrates an alarm system constructed according to the principles of the present invention.

Turning now to FIG. 2, illustrated is an alarm system constructed according to the principles of the present invention. The alarm system 200 is comprised of a local transceiver 210 coupled to a local controller 220, allowing bidirectional communication therewith. The transceiver is also wirelessly coupled to a wireless central monitoring station (WCMS) 230 as part of a wireless voice network. Further, the controller 220 is coupled to various sensors 240, a user-triggered "panic button" 250 and various controlled devices 260.

The sensors 240 supply information typically monitored by alarm systems (e.g., unauthorized entries or broken windows). Those skilled in the art will understand that the conditions monitored by he sensors can be almost any monitorable condition and is not limited to those typically observed by alarm systems. The panic button 250 is a user-activated device that activates the alarm system, causing the system to alarm signal the WCMS 230. The controlled device is a apparatus whose function is affected by a signal from the controller 220 when an alarm is triggered, either by a user or a predetermined alarm condition.

This system may be employed in all types of environments, including residential locations, commercial sites and automobiles. In residential locations and commercial sites, the sensors 240 could take the form of motion sensors, pressure plates and window or door monitoring devices. The sensors can monitor movement within the residence or commercial site, opening of doors and windows, removal of objects (e.g., pieces of art), temperature, air quality or any other detectable condition.

In an automobile, the sensors 240 can monitor doors, windows, the trunk and the hood. Also, the sensors 240 could monitor the engine, tires, gas cap or even the alarm system itself. Presently, auto thieves are able to counter many auto alarm systems by severing power to the system. Sensors within the system could monitor internal power and register a loss of power.

The panic button 250 is employed when a user remotely activates the alarm system. In a residential setting, a user could activate the panic button 250 when the user believes an intruder has entered the residence, when a fire endangers the user or the residence or when the user has "fallen and can't get up."

The controlled device 260 is activated/deactivated by the controller 220 when an alarm has occurred. In a residential setting, when the controller 220 determines, via the sensor 240, that the oven has been left on, an alarm can be transmitted through the transceiver 210 and the controlled device 260, the oven, can be deactivated, possibly avoiding a fire. The controlled device 260 could be a switch in residence that turns on all of the lights when the user activates the panic button, fearing the presence of an intruder.

In a commercial setting which could also apply to residential applications, the sensors 240 could be smoke detectors, the panic button 250 could be a hand-activated fire alarm and the controlled device 260 could be water sprinkler system. Upon signals from either the sensors 240 or the panic button 250, the controller 220 activates the sprinklers, the controlled device 260, and would direct the transceiver 210 to transmit an alarm signal the WCMS 230, which could be a local fire department dispatcher.

In an automobile, the controlled device 260 may be the ignition which is disabled or may be the horn and headlights which are turned on when a would-be thief breaks a window or picks a door lock monitored by the sensors 240. Additionally, in a situation where the user fears an attack by an aggressor, the activated panic button 250 could activate the controlled device 260, again the horn and headlights, to frighten off the would be attacker. Once the system 200 initiated a local alarm, the controller 220 would command the transceiver 210 to establish a wireless link to the WCMS 230 to transmit alarm signal data.

In another embodiment of the present invention, the alarm system 200 includes a video camera that sends image data to the WCMS 230. Like the sensors 240 or the controlled device 260, the video camera is coupled to the local controller 220, enabling data to be sent through the local transceiver 210 to the WCMS 230. By way of the Internet or other communications mediums with appropriate security protocols, a traveler or remote user can connect to the WCMS 230 and examine the status of a residential or commercial alarm system 200. Further, the user may even access image data from the camera to actually view a room in the home or business from a remote location. The bandwidth required by the wireless link remains minimal as the video data or system status data would be transmitted over the diminished bandwidth wireless link to the WCMS 230 and then by conventional data transfer means to the user.

In an alternate embodiment of the present invention, the alarm system 200 includes a message system which can be accessed through the WCMS 230 utilizing the diminished bandwidth wireless link. Similar to the previous embodiment, the user is able to access messages in either voice or data format that originate from a residential or commercial site. In such an embodiment, phone lines at the residential or commercial site are monitored and answered by an automated system (i.e., an answering machine). These recorded message are uploaded and stored in the controller 220 and retrieved by the remote user in a manner similar to the retrieval of video images in the previous embodiment.

Finally, in another embodiment of the present invention, the alarm system 200 is configured to allow multiple users to access or receive system status data from a single central site. Rather than allowing multiple users to access data at a remote residential/commercial site or requiring the site to transmit data to multiple recipients, the site communicates the data to the WCMS 230 which, in turn, grants access to selected users. Once the data from the site in question is received, the WCMS 230 transmits the data to the users or allows access to those authorized via the Internet or other communications mediums.

Figure 3:
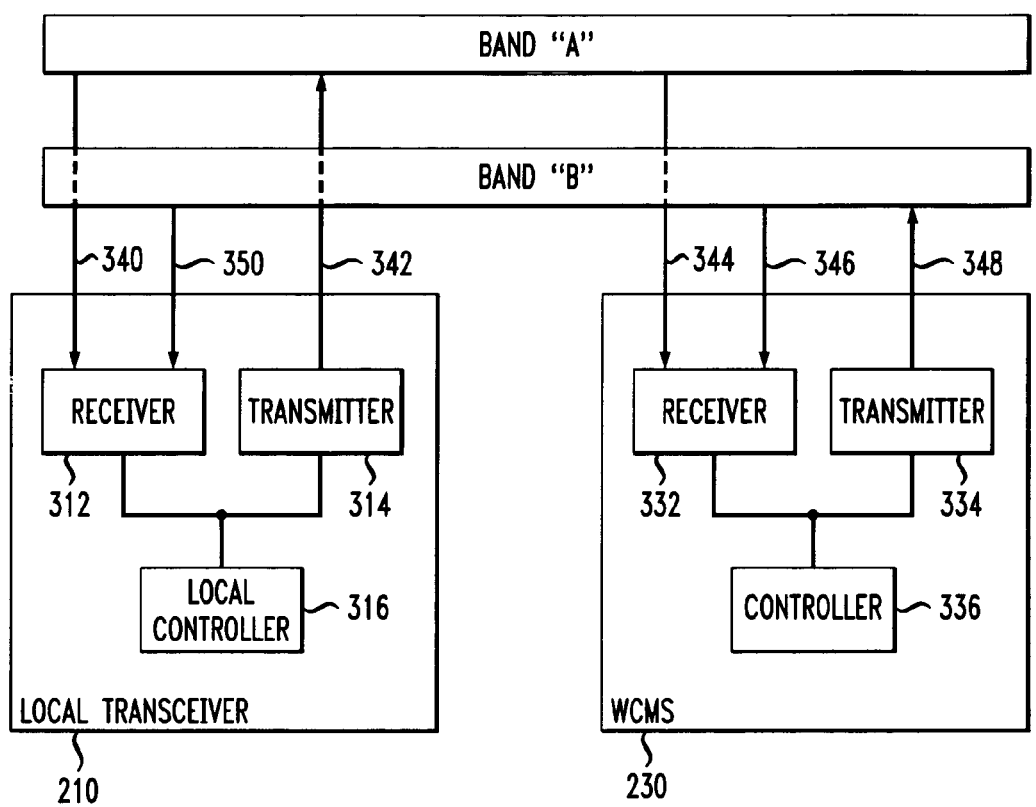
FIG. 3 illustrates a block diagram of a local transceiver and a wireless central monitoring station capable of cooperating to establish an out-of-band wireless link of diminished bandwidth in a wireless voice network.

Turning now to FIG. 3, illustrated is a block diagram illustrating the local transceiver 210 and the WCMS 230, both of FIG. 2, in greater detail. The local transceiver 210 and the WCMS 230 are capable of cooperating to establish an out-of-band wireless link of diminished bandwidth in a wireless voice network.

The local transceiver 210 comprises a receiver 312, a transmitter 314 and a local controller 316. The WCMS likewise comprises a receiver 332, a transmitter 334 and a controller 336.

The receiver 312 of the local transceiver 210 is tuned to a frequency at which the transmitter 314 is to transmit. In the illustrated embodiment, the frequency is a frequency at which the wireless voice network commonly operates and is most advantageously a frequency at which wireless stations transmit to base stations of the wireless voice network. FIG. 3 illustrates that frequency schematically as Band "A."

In response to detection of an alarm event, the local controller 316 causes the receiver 312 to monitor the frequency to determine whether sufficient bandwidth exists to establish a wireless link of diminished bandwidth over which to transmit an alarm signal (represented by an arrow 340). The sufficiency of the bandwidth is determined by the amount of information to be transmitted in the alarm signal, but the alarm signal can be broken up into smaller separate transmissions to accommodate smaller bandwidth.

Sufficient bandwidth may be obtained between transmissions of packets of digital data or at frequencies slightly over or under that of the normal traffic that the wireless voice network carries. Thus, the bandwidth employed for transmission of alarm signals is around the normal traffic. Unlike CDPD, however, the bandwidth taken to transmit the alarm signal does not materially slow or interrupt the transmission of the normal voice traffic and thus does not decrease the bandwidth of the wireless voice network that is available for normal voice traffic. In this sense, the wireless link of diminished bandwidth may be thought of as "out-of-band" with respect to the normal voice traffic.

When the local controller 316 finds sufficient bandwidth to establish a wireless link, the local controller 316 sends all or part of the alarm signal to the transmitter 314 for transmission along the wireless link. In response, the transmitter 314 transmits the alarm signal to the WCMS 230 (represented by an arrow 342).

On the receiving side, the receiver 332 associated with the WCMS 230 monitors the same frequency as that employed by the transmitter 314 of the local transceiver 210 (represented by an arrow 344). When the receiver 332 receives an alarm signal, the controller 336 interprets the alarm signal and takes appropriate action in response thereto.

When it is desired that the WCMS 230 communicate with the local transceiver 210 (perhaps to download non-alarm related data or to perform routine maintenance and diagnostics), the process outlined above for transmission of alarm signals is advantageously reversed.

The receiver 332 of the WCMS 230 is tuned to a frequency at which the transmitter 334 is to transmit. In the illustrated embodiment, the frequency is a frequency at which the wireless voice network commonly operates and is most advantageously a frequency at which base stations transmit to wireless stations of the wireless voice network.

In response to receiving a command to establish a wireless link of diminished bandwidth, the controller 336 causes the receiver 332 to monitor the frequency to determine whether sufficient bandwidth exists to transmit the command (represented by an arrow 346). The sufficiency of the bandwidth is determined by the amount of information to be transmitted in the command, but the command can be broken up into smaller separate transmissions to accommodate smaller bandwidth.

When the controller 336 finds sufficient bandwidth to establish a wireless link, the controller 336 sends all or part of the command to the transmitter 334 for transmission along the wireless link. In response, the transmitter 334 downloads the command to the local transceiver 210 (represented by an arrow 348).

On the receiving side, the receiver 312 associated with the local transceiver 210 monitors the same frequency as that employed by the transmitter 334 of the WCMS 230 (represented by an arrow 350). When the receiver 312 receives the command, the local controller 316 interprets the command and takes appropriate action in response thereto.

Figure 4:
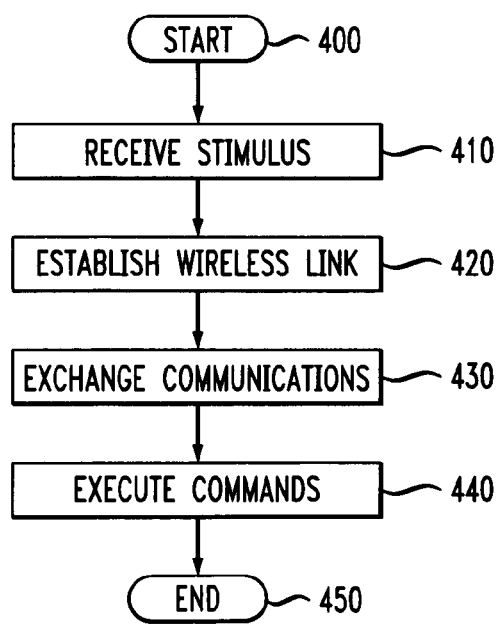
FIG. 4 illustrates a flow diagram of a method of operating an alarm system constructed according to principle of the present invention.

Turning now to FIG. 4, illustrated is a flow diagram of a method of operating an alarm system constructed according to principle of the present invention. With continued reference to FIG. 2, the alarm system 200 operates as follows. The method begins at a start step 400. At a receive stimulus step 410, the transceiver 210 senses a stimulus from either the controller 220 or from the WCMS 230. Should there be a local alarm, the controller signals the transceiver 210 to contact the WCMS 230 to relay the appropriate signal, including whether the alarm is user-triggered (via a panic button) or intruder-triggered. Conversely, if the WCMS 230 seeks to check the status the alarm system 200, the WCMS 230 contacts the transceiver 210 to establish a link to receive data from the controller 220.

Once the transceiver 210 senses the stimulus, a wireless link of diminished bandwidth is established between the transceiver 210 and the WCMS 230 during an establish wireless link step 420 for the bidirectional exchange of information and relevant commands. At an exchange communications step 430, the controller 220 sends data to the transceiver 210 which are then relayed to the WCMS 230, usually in data bursts. Once the WCMS 230 receives the data, the WCMS 230 issues commands to the transceiver 210 that are relayed to the controller 220. Further, in situations where the WCMS 230 initiates a wireless link, the WCMS 230 may direct the controller 220, via the transceiver 210, to download any requested information or execute any commands, even though an alarm state may not exist. The WCMS 230 can either communicate with the alarm system 200 singularly or it may broadcast commands to a plurality of alarm systems as referenced in FIG. 1.

The controller 220 executes the received commands during an execute commands step 440. Such commands range from downloading data collected by the controller 210 (e.g., number and times of door openings) to synchronizing an internal clock to issuing control commands to a controlled device 260. For example, should an alarm exist, such as a fire alarm, the WCMS 230 could issue commands to the controller 220 to activate a water sprinkler system if the internal program within the controller 220 has not done so. Alternatively, when no alarm state exists and through a predetermined time schedule, the WCMS 230 could issue commands to the controller 220 to turn on and off lights within a home to deter possible trespassers when the residents are absent. Once the received commands are executed, the method of operation concludes at an end step 450.

From the above, it is apparent that the present invention provides, for use in a wireless voice network, an alarm system and method of operation thereof. In one embodiment, the alarm system includes: (1) a local transceiver that, in response to a received stimulus, establishes a wireless link of diminished bandwidth to a wireless central monitoring station in the wireless voice network and (2) a local controller, coupled to the transceiver for bidirectional communication therewith, that receives commands from the wireless central monitoring station via the wireless link.

Although the present invention has been described in detail, those skilled in the art should understand that they can make various changes, substitutions and alterations herein without departing from the spirit and scope of the invention in its broadest form.

What is claimed is:

1. For use in a wireless voice network capable of voice communication and having a wireless central monitoring station, an alarm system, comprising:
   a local transceiver configured to establish, in response to a received stimulus, a wireless link of diminished bandwidth over said wireless voice network to said wireless central monitoring station that has a bandwidth insufficient to provide commercially-acceptable quality of service standards for voice communication; and
   a local controller, coupled to said transceiver for bidirectional communication with said wireless central monitoring station, configured to receive and send commands and data from and to said wireless central monitoring station via said wireless link.

2. The alarm system as recited in claim 1 wherein said local transceiver and said wireless central monitoring station exchange data in bursts.

3. The alarm system as recited in claim 1 wherein said stimulus is an alarm event communicated from said local controller to said local transceiver.

4. The alarm system as recited in claim 3 wherein said local event is selected from the group consisting of:
   a user-triggered alarm event, and
   an intruder-triggered alarm event.

5. The alarm system as recited in claim 1 wherein said stimulus is a command communicated from said wireless central monitoring station to said local transceiver.

6. The alarm system as recited in claim 5 wherein said wireless link is exclusively established with said local transceiver.

7. The alarm system as recited in claim 5 wherein said local transceiver receives said command when said command is broadcasted to a plurality of transceivers.

8. For use in a wireless voice network capable of voice communication and including a wireless central monitoring station, a method of operating an alarm system, comprising:
   establishing a wireless link of diminished bandwidth over said wireless voice network to said wireless central monitoring station with a local transceiver and in response to a received stimulus, wherein said wireless link has a bandwidth insufficient to provide commercially-acceptable quality of service standards for voice communication; and receiving and sending commands and data from and to said wireless central monitoring station via said wireless link into a local controller coupled to said transceiver for bidirectional communication with said wireless central monitoring station.

9. The method as recited in claim 8 further comprising the step of exchanging data between said local transceiver and said wireless central monitoring station in bursts.

10. The method as recited in claim 8 wherein said stimulus is an alarm event communicated from said local controller to said local transceiver.

11. The method as recited in claim 10 wherein said local event is selected from the group consisting of:
   a user-triggered alarm event, and
   an intruder-triggered alarm event.

12. The method as recited in claim 8 wherein said stimulus is a command communicated from said wireless central monitoring station to said local transceiver.

13. The method as recited in claim 12 wherein said step of establishing comprises the step of establishing said wireless link exclusively between said wireless central monitoring station and said local transceiver.

14. The method as recited in claim 12 wherein said step of establishing comprises the step of broadcasting said command from said wireless central monitoring station to a plurality of transceivers including said local transceiver.

15. A wireless voice network capable of voice communication, comprising:
   a wireless central monitoring station;
   a plurality of alarm systems wirelessly couplable to said wireless central monitoring station for communication therewith, each of said plurality of alarm systems including:
   a local transceiver configured to establish, in response to a received stimulus, a wireless link of diminished bandwidth over said wireless voice network to said wireless central monitoring station that has a bandwidth insufficient to provide commercially-acceptable quality of service standards for voice communication, and
   a local controller, coupled to said transceiver for bidirectional communication with said wireless central monitoring station, configured to receive and send commands and data from and to said wireless central monitoring station via said wireless link.

16. The alarm network as recited in claim 15 wherein said local transceiver and said wireless central monitoring station exchange data in bursts.

17. The alarm network as recited in claim 15 wherein said stimulus is an alarm event communicated from said local controller to said local transceiver.

18. The alarm network as recited in claim 17 wherein said local event is selected from the group consisting of:
   a user-triggered alarm event, and
   an intruder-triggered alarm event.

19. The alarm network as recited in claim 15 wherein said stimulus is a command communicated from said wireless central monitoring station to said local transceiver.

20. The alarm network as recited in claim 19 wherein said wireless central monitoring station is configured to establish said wireless link exclusively with said local transceiver.

21. The alarm network as recited in claim 19 wherein said wireless central monitoring station is configured to broadcast said command to said plurality of alarm systems.

* * * * *